Jan. 12, 1971  A. M. SABROFF ET AL  3,553,996
EXTRUSION OF BRITTLE MATERIALS
Filed Nov. 13, 1967
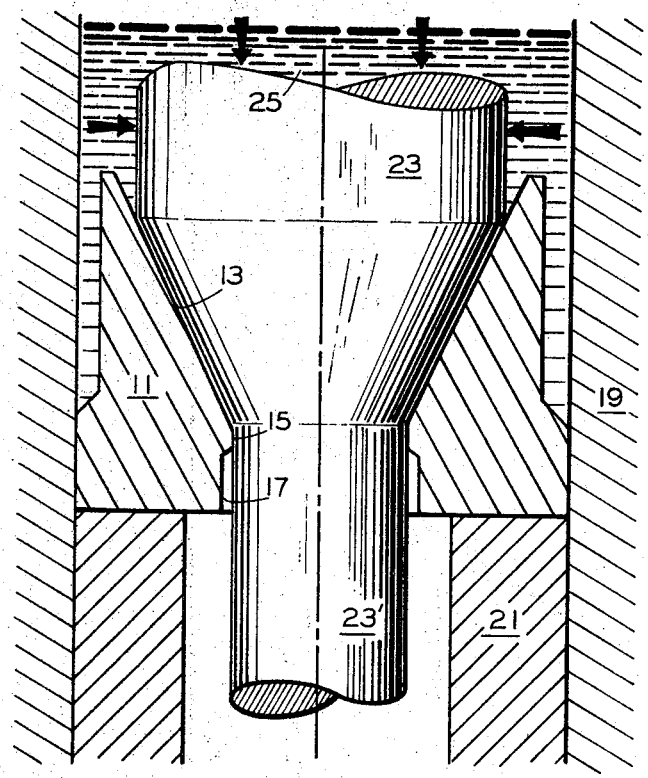
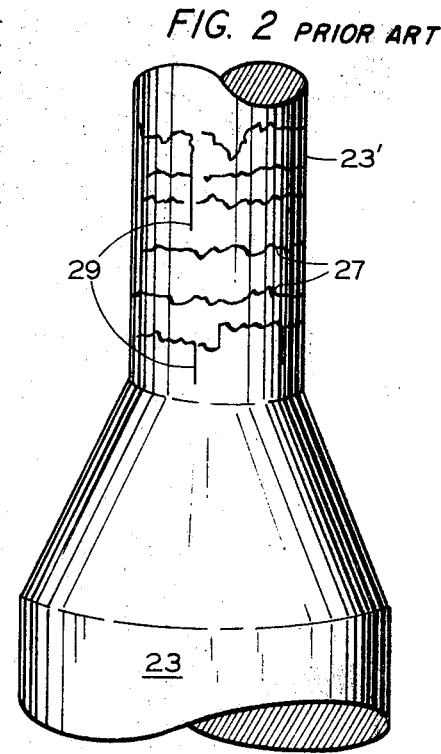
FIG. 2 PRIOR ART
FIG. 1 PRIOR ART
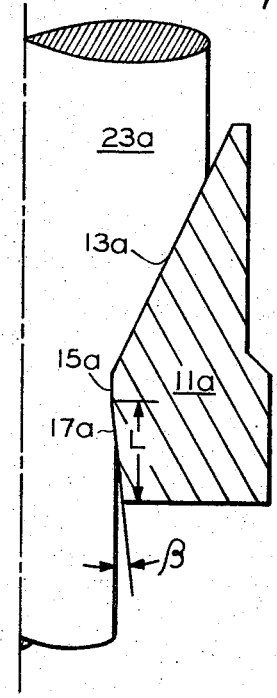
FIG. 3
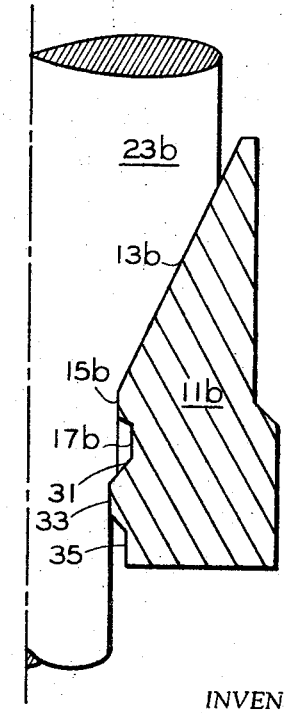
FIG. 4
INVENTORS
ALVIN M. SABROFF,
ROBERT J. FIORENTINO,
& BARRY D. RICHARDSON
BY GRAY, MASE, & DUNSON
ATTORNEYS

United States Patent Office 3,553,996
Patented Jan. 12, 1971

3,553,996
EXTRUSION OF BRITTLE MATERIALS
Alvin M. Sabroff, Columbus, Robert J. Fiorentino, Worthington, and Barry D. Richardson, Columbus, Ohio, assignors to The Battelle Development Corporation, Columbus, Ohio, a corporation of Delaware
Filed Nov. 13, 1967, Ser. No. 682,316
Int. Cl. B21d 22/10
U.S. Cl. 72—60      5 Claims

ABSTRACT OF THE DISCLOSURE

A method of extruding brittle materials which comprises forcing a billet of brittle material through a die having a relief portion at its exit end which tapers laterally outward at a very small angle to apply an abnormally high radial compressive stress on the exiting extrusion. The die may alternately be formed having awo coaxial land portions with the land portion at the exit end of the die applying a longitudinal compressive stress on the outer fibers only of the length of extrusion between land portions.

BACKGROUND OF THE INVENTION

This invention relates to extrusion of brittle materials. More specifically it relates to methods of extruding brittle materials at temperatures below the brittle-ductile transition temperature of the material to produce a crack-free product.

Brittleness is the quality of a material that leads to crack propagation without appreciable plastic deformation. Brittle materials are materials which exhibit brittleness at ordinary temperatures and, therefore, have low ductility or malleability at those temperatures. Such materials include, but are not limited to, beryllium, tungsten, boron, molybdenum, TZM molybdenum alloy, superalloys of nickel, chromium, and cobalt, certain superconducting materials, and certain-metal-metal oxide composites such as the group of composites called sintered aluminum products (SAP).

Heretofore, brittle materials had to be extruded either by fluid-to-fluid hydrostatic techniques or by conventional extrusion at high temperatures. Attempts to extrude brittle materials at temperatures below their brittle-ductile transition temperature using conventional cold extrusion techniques generally result in badly crumbled or cracked products. (Cold extrusion generally refers to extrusion at temperatures below the recrystallization temperature but for purposes of this discussion it will be further limited to extrusion at temperatrues below the brittle-ductile transition temperature of the brittle material being extruded.) The cracks typically exhibited by these materials after cold extrusion included both circumferential and longitudinal cracks. The circumferential cracking which was observed does not ordinarily occur when cold extruding other materials such as low-alloy steels and aluminum but almost always occurs when cold extruding brittle materials.

Historically, crack-free cold extrusions of brittle materials were obtainable only when the product was hydrostatically extruded into a chamber producing a fluid backpressure [see: Pugh, H. L. D., and Gunn, D. A., "The Cold Extrusion of Brittle Materials Against a Hydrostatic Pressure," NEL Report No. 31, National Engineering Laboratory, East Kilbridge, Glasgow (1962); and Bobrowsky, A., and Stack, E. A., "A Study to Determine the Deformation Characteristics of Beryllium and Tungsten Under Conditions of High Hydrostatic Pressures," Final Report, Bureau of Naval Weapons, Contract No. N 600(19)–59430 (September 1963)]. This technique is often referred to as differential-pressure hydrostatic extrusion or fluid-to-fluid extrusion. In this method the superimposed counterpressure improves the billet ductility during deformation by increasing the hydrostatic stress component in the deformation zone. This approach, however, has several disadvantages which appear to limit its usefulness. Among the disadvantages are the higher tooling and operational costs associated with the use of a secondary pressure chamber and the fact that extrusion lengths are limited to the length of the secondary pressure chamber. Also the fluid pressure required to achieve a given reduction in fluid-to-air extrusion must be increased by the amount of counterpressure used in fluid-to-fluid extrusion. This lowers the maximum ratios that can be achieved with a pressure chamber of a given fluid pressure capability.

It is generally known from work with other materials that cold extrusion greatly improves the quality of extruded products and reduces costs. Advantages of cold extrusion include a greater degree of strengthening through work-hardening, better surface finish, better dimensional control, longer tool life, ease of lubrication, and decreased problems of toxicity and/or contamination when toxic materials are involved. It is, therefore, the objective of this invention to provide a method and apparatus for extruding brittle materials at temperatures below the brittle-ductile transition temperature of the material to produce a crack-free product of greatly improved quality.

SUMMARY OF THE INVENTION

The present invention provides a method of extruding brittle materials which comprises forcing a billet of brittle material through a die having a relief portion at its exit end which tapers laterally outward at a sufficiently small angle to apply an abnormally high radial compressive stress on the exiting extrusion. Typically the relief portion of the die tapers at an angle of less than one degree and is 0.25 to 2.0 inches in length. The billet may be extruded at temperatures below the brittle-ductile transition temperature of the billet material.

In an alternative method, the billet or brittle material may be extruded through a die having two coaxial land portions consisting of a first land portion disposed to effect a first reduction and a second land portion disposed to effect an additional reduction less than the first reduction and further disposed to apply a longitudinal compressive stress on the outer fibers only of the length of extrusion between the two land portions. The second land portion typically effects a 1.0 to 3.0 percent area reduction and is spaced from the first land portion at a sufficiently small distance to prevent release between the two land portions of substantially all of the residual stresses in the extrusion. The billet may be extruded at temperatures below the brittle-ductile transition temperature of the billet material.

The present invention effects a gradual release of elastic stresses during deformation of brittle materials at temperatures below their brittle-ductile transition temperature to substantially reduce or eliminate both circumferential and longitudinal cracking. This invention allows crack-free extrusion of brittle materials to be made without utilizing a secondary pressure chamber. The quality of the extruded product is greatly improved as is typical with cold extrusion processes.

BRIEF DESCRIPTION OF THE DRAWINGS

FIG. 1 shows in vertical section a billet of brittle material in position in the extrusion chamber of a hydrostatic extrusion press after partial extrusion of the billet through a standard extrusion die.

FIG. 2 shows the cracked billet of brittle material after partial extrusion through the standard die shown in FIG. 1.

FIG. 3 is a partial sectional view of a billet of brittle material during extrusion of the billet through a die having a controlled-relief area.

FIG. 4 is a partial sectional view of a billet of brittle material during extrusion of the billet through a double-reduction die.

DESCRIPTION OF THE PREFERRED EMBODIMENT

FIG. 1 illustrates fluid-to-air extrusion of a billet of brittle material utilizing a conventional standard die. The standard die 11 is formed with a tapered entry portion 13 at its entrance end, a relief portion 17 at its exit end, and a land or bearing portion 15 (the die hole) intermediate the entry and relief portions. The die 11 is supported within the press chamber 19 of a suitable hydrostatic extrusion press by an annular die retaining member 21. A billet 23 of brittle material is placed in the press chamber 19 and hydrostatically extruded through the die 11 by means of the hydrostatic fluid 25 to form the extruded product 23'.

The standard die 11 has an abrupt relief, generally 0.010 inch or more on the radius, immediately after the land portion 15. At that point, the exiting extrusion suddenly expands elastically and severe elastic bending of the surface fibers of the extrusion occurs. The longitudinal tensile stresses introduced by the elastic bending of the surface fibers can be quite high and are often close to the elastic limit of the extrusion. These longitudinal tensile stresses when coupled with tensile stresses introduced by friction in the die land and any residual tensile stresses (such as hoop stresses) developed in the extrusion by the deformation process itself are often sufficient to initiate cracking in a brittle material. This is especially true when brittle materials are extruded at temperatures below their brittle-ductile transition temperature. Brittle materials generally respond differently to cold extrusion than do other materials in that they exhibit both circumferential and longitudinal cracking.

FIG. 2 shows the billet 23 after partial extrusion through the standard die 11 of FIG. 1. The extruded product portion 23' of the billet 23 is shown with cracks that are typical of those observed in virtually all test extrusions using the standard die 11. Circumferential cracks 27 ("fir-tree" or "rattlesnake" type) are generally more or less perpendicular to the axis of the extrusion and extend laterally into the extrusion to various depths. In severe cases, circumferential cracks extend completely through the extrusion causing the extruded product to crumble into short sections or layers. Longitudinal cracks 29 generally run axially along the outer surface of the extrusion and often extend radially inward as far as the center of the extruded product or farther. It is believed that the longitudinal tensile stresses created at or near the surface of the extrusion by the elastic bending of surface fibers are primarily responsible for circumferential cracking and that the residual hoop tensile stresses developed during deformation are primarily responsible for longitudinal cracking.

Standard dies having relief portions which taper laterally outward from the land portion at a predetermined angle rather than having an abrupt relief as in the die 11 previously described also produce cracking in cold extruded brittle materials. The included angle of the relief portion of most standard tapered relief dies is generally in the range of 10 to 20 degrees. Although the tapered relief dies do reduce cracking somewhat, both circumferential and longitudinal cracks are still present. It is believed that the relief angles commonly used in cold extrusion tapered relief dies (included angles of 10 to 20 degrees) do not control surface fiber bending and residual stresses to the extent required for extrusion of brittle materials at temperatures where brittleness is exhibited.

It has been found that extruding a billet through a die having a very small relief angle effects a very gradual release of elastic stresses and, in so doing, reduces the tensile stresses due to bending. Such a die is shown in FIG. 3 and for purposes of discussion will be termed a "controlled relief" die. The controlled-relief die 11a is formed with a tapered entry portion 13a at its entrance and, a tapered relief portion 17a at its exit end, and a land portion 15a intermediate the entry and relief portions. The relief portion 17a is tapered laterally outward from the land portion 15a at an angle $\beta$ not greater than 1 degree. (This provides an included relief angle not greater than 2 degrees.) The length L of the relief portion 17a is generally sufficient to allow elastic expansion of the exiting product to be completed prior to passage of the extruded product from the die.

Particular success has been achieved with controlled-relief dies having relief portions 0.25 to 2.0 inches in length which taper at an angle $\beta$ in the range of 0°10'0" to 0°0'10". However, the particular length and angle of the relief portion of a particular controlled-relief die will depend, to some extent, upon the material being extruded. Following are specific applications of the controlled relief die method for extruding brittle materials:

EXAMPLE 1

A 1.75 inch diameter billet of stress relieved wrought TZM alloy, a relatively brittle material at room temperature, was hydrostatically extruded at 80° F. through a controlled-relief die according to this invention. The die had an entry angle (included) of 45 degrees and the land portion was 0.125 inch in length. The relief portion of the die employed was 2.0 inches in length and tapered at an angle of 1'35" with the axis of the die. The extrusion ratio was 3.3:1 and the stem speed was 6.0 inches per minute. The hydrostatic fluid was castor oil and a lubricant of 20 weight percent molybdenum disulfide in castor wax are used. An extruded rod about 10 inches in length was achieved with circumferential cracking occurring only for a short distance of approximately one inch at the nose of the extrusion. However, three fine, hairline-type longitudinal cracks persisted.

EXAMPLE 2

A 1.75 inch diameter billet of recrystallized wrought TZM alloy was hydrostatically extruded at 80° F. through the die described in Example 1 under the same conditions. A polytetrafluoroethylene laquer lubricant was employed. An extruded rod about 10 inches in length was produced which displayed less circumferential cracking than the product in Example 1. However, three fine, hairline-type longitudinal cracks were still present.

Previous attempts to cold extrude TZM allows billets and billets of other brittle materials using standard dies resulted in substantial circumferential and longitudinal cracking of the extruded product. In successive trials using dies having small relief angles, it was found that relief angles of less than one degree will substantially reduce or eliminate circumferential cracking in both beryllium and TZM alloy. It is believed that the very small relief angles of the controlled-relief die apply an abnormally high compressive stress to the exiting extrusion to effect a gradual release of radial stresses and prevent rapid elastic bending of the surface fibers. The gradually tapering relief portion of the die may also apply some limited longitudinal stress to the extrusion either through increased frictional forces or some other mechanism not understood at the present time.

It was also observed that longitudinal cracking was less severe when smaller relief angles were employed. It is believed that longitudinal cracking can be eliminated by using even smaller relief angles although no trials have been conducted as of this time.

FIG. 4 illustrates an alternative die configuration which may be used to obtain crack-free extrusions of brittle materials at temperatures below their brittle-ductile transition temperature. This die is formed with two coaxial land portions, the second of which effects a relatively small second reduction while applying a longitudinal compressive stress to the outer fibers of the length of extrusion between land portions. For purposes of discussion this die will be termed a "double-reduction" die.

Referring to FIG. 4, the double-reduction die 11b is formed with a tapered entry portion 13b at it entrance end which is constructed leading into a first land portion 15b. A first relief portion 17b is provided after the first land portion. A second entry portion 31 follows the first relief portion 17b and leads into a second land portion 33 which is constructed to effect a small second reduction. A second relief portion 35 is provided after the second land portion 33 and at the exit end of the die to allow for release of stresses accumulted in the extrusion.

The second land portion 33 is generally spaced from the first land portion 15b at a sufficiently small distance to prevent both longitudinal and circumferential cracking in the extrusion between the two land portions. In some cases the first relief portion 17b may not be used in which case the distance between land portions would be the height of the second entry portion 31. It has been found that spacing the land portions at a distance which is greater than twice the largest dimension of the cross-section of the second land portion will, in most cases, cause premature release of elastic stresses. This is due, in part, to the fact that the corrective stresses set up by the second land portion diminish along the length of the extrusion between land portions and if the land portions are spaced too far apart the corrective stresses will have no appreciable effect in the area immediately following the first land portion. When this occurs, the elastic stresses set up by the first land portion are released to an extent that cracks are formed in the extrusion prior to entry into the second land portion. If these cracks are allowed to form, they will not be healed by the subsequent reduction. Therefore, the spacing of the land portion is critical to the extent that it must prevent the premature release of elastic stresses sufficient to cause cracking. Although the spacing will depend largely on the material being extruded, particular success has been achieved with the land portions spaced at a distance not greater than about 1.0 inch.

The second land portion 33 preferably effects a reduction of about 1.0 to 3.0 percent of the cross-sectional area of the extrusion. In addition to effecting the second reduction, the land portion 33 also applies a longitudinal compressive stress on the outer fibers of the length of extrusion between the two land portions. The main function of the resulting longitudinal compressive stress is to minimize the level of any longitudinal tensile stresses developed in the outer fibers as a result of extrusion through the first land portion 31. By reducing these longitudinal tensile stresses, circumferential cracking on exit from the first land portion is prevented. The prevention of such cracking may also be assisted by the increase in hydrostatic stress components in the deformation zone caused by the longitudinal compressive stress.

The longitudinal compressive stress is imposed only on the outer fibers which are to undergo the second reduction, and not on the entire cross-section of the extrusion. This means that if the area reduction at the second land is 2.0 percent, the longitudinal compressive stress would be applied only to the outer 2.0 percent of the extrusion which is reduced. Of course, some longitudinal compressive stress is transferred inwardly to adjacent fibers but only for a very short and insignificant distance. The important element of the present invention is that the longitudinal compressive stress is applied only to the outer fibers of the extrusion and not on the entire cross-sectionl area as it is in fluid-to-fluid extrusion.

It has been found that a second reduction of less than about one percent does not create sufficient longitudinal compressive stress to prevent cracking. Of course, this depends upon the size of the first reduction but for extrusion ratios greater than 2:1 it is almost always true. Also a second reduction of greater than about 3.0 percent will form elastic stresses in the exiting extrusion of such magnitude that cracking will be initiated during run-out. Therefore, for most brittle materials the size of the second reduction is critical.

In addition to eliminating circumferential cracking, another important aspect of the second reduction is that it also prevents longitudinal cracking. It is believed that the small second reduction effects a favorable change in the residual stress pattern by reducing the level of hoop tensile stresses. The effectiveness of the double-reduction die in eliminating longitudinal and circumferential cracking is apparent from the following examples:

EXAMPLE 3

A 1.75 inch diameter billet of stress relieved wrought TZM alloy was hydrostatically extruded at 80° F. through a double-reduction die according to this invention. The entry angle at both land portions of the die was 45° (included) and each land was 0.125 inch in length. The distance between land portions was 0.625 inch. The extrusion ratio was 4:1 with the second reduction being 2.0 percent. The total reduction was 74.6 percent The hydrostatic fluid was castor oil and a polytetrafluoroethylene lacquer lubricant was used. The stem speed was 20.0 inches per minute. A12-inch length of rod was extruded completely free of both circumferential and longitudinal cracks. The initial portion of the extrusion which was extruded through the first land portion prior to the application of the longitudinal compressive stress by the second land portion was badly cracked both circumferentially and longitudinally but was able to be cut from the crack-free portion of the extrusion without initiating any further cracking.

EXAMPLE 4

A 1.75 inch diameter billet or beryllium (powder origin) was hydrostatically extruded through the die described in Example 3 under the same conditions. A crack-free extrusion about 15 inches in length was obtained.

As is apparent from the examples, crack-free cold extrusion of brittle materials at temperatures below their brittle-ductile transition temperatures was achieved without the use of a fluid back-pressure. The quality of the surface of the extruded products was significantly improved over results obtained with hot extrusion of the same materials. The beryllium material was also markedly strengthened by cold working. The ultimate and yield strengths obtained were 50 and 100 percent higher, respectively, than typical values for commercial hot-extruded bar having the same oxide content. Materials extruded according to the present invention at temperatures above room temperature but below the brittle-ductile transition temperature of the material exhibited, in many cases, even higher strengths as did materials extruded using higher extrusion ratios.

Extrapolation of data for extrusion at 80° F. indicates that both beryllium and TZM alloy can be extruded at ratios of about 30:1 by a fluid pressure of 450,000 p.s.i. The estimated ratio achievable at 500° F. for beryllium within that pressure capacity is approximately 50:1. It is obvious that fluid-to-fluid extrusion of these materials at these ratios would require primary fluid pressures well in excess of 450,000 p.s.i. The present invention, therefore extends the range of extrusion ratios that can be achieved using a press of given pressure capability.

It should be understood that the method and apparatus of this invention are not limited to extrusion of round bars or rods but may be employed to extrude any required shape including, but not limited to, T-shapes, L-shapes, and tubes. The materials used to construct the various dies are those commonly used in the art. The methods and dies according to this invention may also be employed for extrusion of brittle materials at temperatures above their brittle-ductile transition temperature or for extrusion of other materials were desirable.

It is to be understood that the foregoing detailed description is given merely by way of illustration and that many variations and modifications may be made therefrom without departing from the true spirit or scope of the invention, and that all such variations and modifications falling within the true spirit and scope of the invention are intended to be encompassed by the appended claims.

What is claimed is:

1. A method of cold extruding brittle materials which comprises extruding a billet of brittle material through a first die land portion at a temperature not greater than the brittle-ductile transition temperature of the billet material to effect a first reduction, and thereafter extruding said billet through a second die land portion, said second land portion being axially aligned and spaced apart from said first land portion, with said second land portion effecting an additional reduction of about 1.0 to 3.0 percent while applying a longitudinal compressive stress on the outer fibers only of the length of extrusion between said land portions, said land portions being spaced to maintain on the extrusion therebetween corrective stresses induced by said second land portion, the extruded billet emerging from said second land portion into a region at atmospheric pressure.

2. A method according to claim 1 wherein the distance between said first and second land portions is less than about twice the largest dimension of the cross section of said second land portion.

3. A method according to claim 1 wherein said second land portion is spaced from said first land portion at a distance not greater than about 1.0 inch.

4. A method according to claim 1 wherein said billet is hydrostatically extruded through said die.

5. A method according to claim 1 wherein said billet is formed of a brittle material selected from the group consisting of beryllium, tungsten, boron, molybdenum, TZM molybdenum alloy, and super-alloys of nickel, chromium, and cobalt.

References Cited

UNITED STATES PATENTS

| 2,907,454 | 10/1959 | Sejournet | 72—467X |
| 3,178,925 | 4/1965 | Nolan | 72—364 |
| 3,157,274 | 11/1964 | Kyle | 72—700X |
| 2,559,679 | 7/1951 | See | 72—468 |
| 2,589,881 | 3/1952 | Sims | 148—12 |
| 2,320,040 | 5/1943 | Landis | 148—12 |

OTHER REFERENCES

"The Hydrostatic Extrusion Of Difficult Metals," pp. 201–217, Journal of The Institute of Metals, 1964–65, vol. 93.

CHARLES W. LANHAM, Primary Examiner

A. L. HAVIS, Assistant Examiner

U.S. Cl. X.R.

72—467, 253, 700, 710